United States Patent

[11] 3,599,764

| [72] | Inventors | Heinz Daab<br>Darmstadt;<br>Karl-Heinz Meier, Darmstadt im<br>Fluerchen, both of, Germany |
|---|---|---|
| [21] | Appl. No. | 842,992 |
| [22] | Filed | July 18, 1969 |
| [45] | Patented | Aug. 17, 1971 |
| [73] | Assignee | Quick-Rotan Becker & Notz KG<br>Darmstadt, Germany |
| [32] | Priority | July 19, 1968 |
| [33] | | Germany |
| [31] | | P 17 63 693.0 |

[54] SHAFT SPEED CONTROL SYSTEM COMPRISING CLUTCH AND BRAKE
19 Claims, 15 Drawing Figs.

[52] U.S. Cl.............................................. 192/12 D,
192/103 R, 307/120, 318/302
[51] Int. Cl........................................F16d 67/06,
H02k 27/20
[50] Field of Search............................. 192/12 D,
17 C, 18 B, 103 R; 303/21 CF; 307/120, 129, 130;
318/269, 302, 304, 328

[56] References Cited
UNITED STATES PATENTS

| 2,001,557 | 5/1935 | Von Ohlsen.................. | 318/328 X |
| 3,065,396 | 11/1962 | Carlson........................ | 318/328 X |
| 3,379,292 | 4/1968 | Grygera........................ | 192/12 D |
| 3,450,912 | 6/1969 | LaVallee....................... | 192/103 X |
| 3,487,438 | 12/1969 | Becker et al.................. | 192/18 B |

Primary Examiner—Allan D. Herrmann
Attorney—Otto John Munz

ABSTRACT: A control circuit for use in a motor drive utilizing selectively electromagnetically actuatable clutch and brake devices. The operating speed of a drive shaft of a utilization device is maintained at a preselected value by generating a rectified DC signal and superimposed AC signal when it falls below a reference value, indicating low shaft speed and causes energization of the clutch for increasing shaft speed. When the shaft speed becomes greater than selected, the generated signal exceeds the reference value and is detected by a second solid-state switch causing actuation of the brake until the shaft speed decreases. Alternating pulsewise nonoverlapping actuation of the clutch and brake devices maintains the utilization device drive shaft at the selected speed.

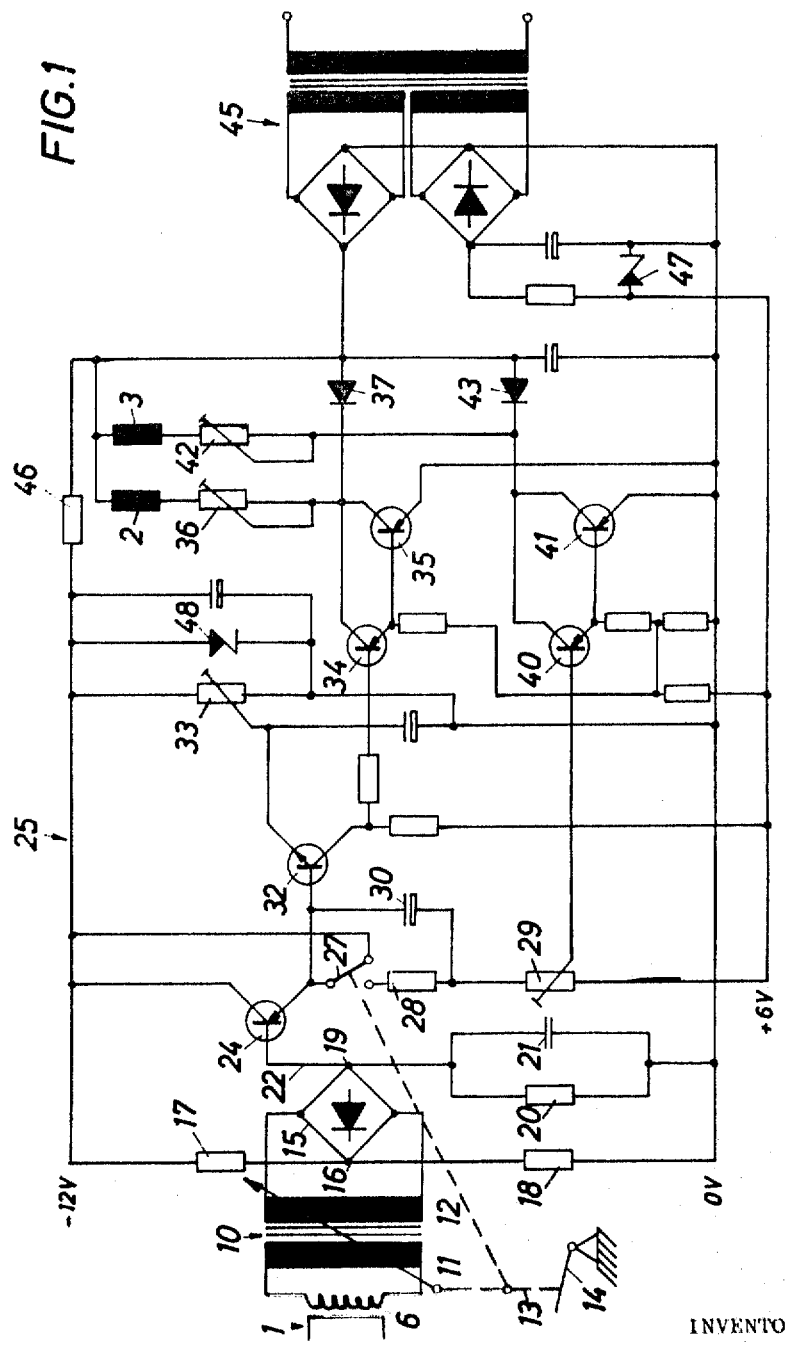

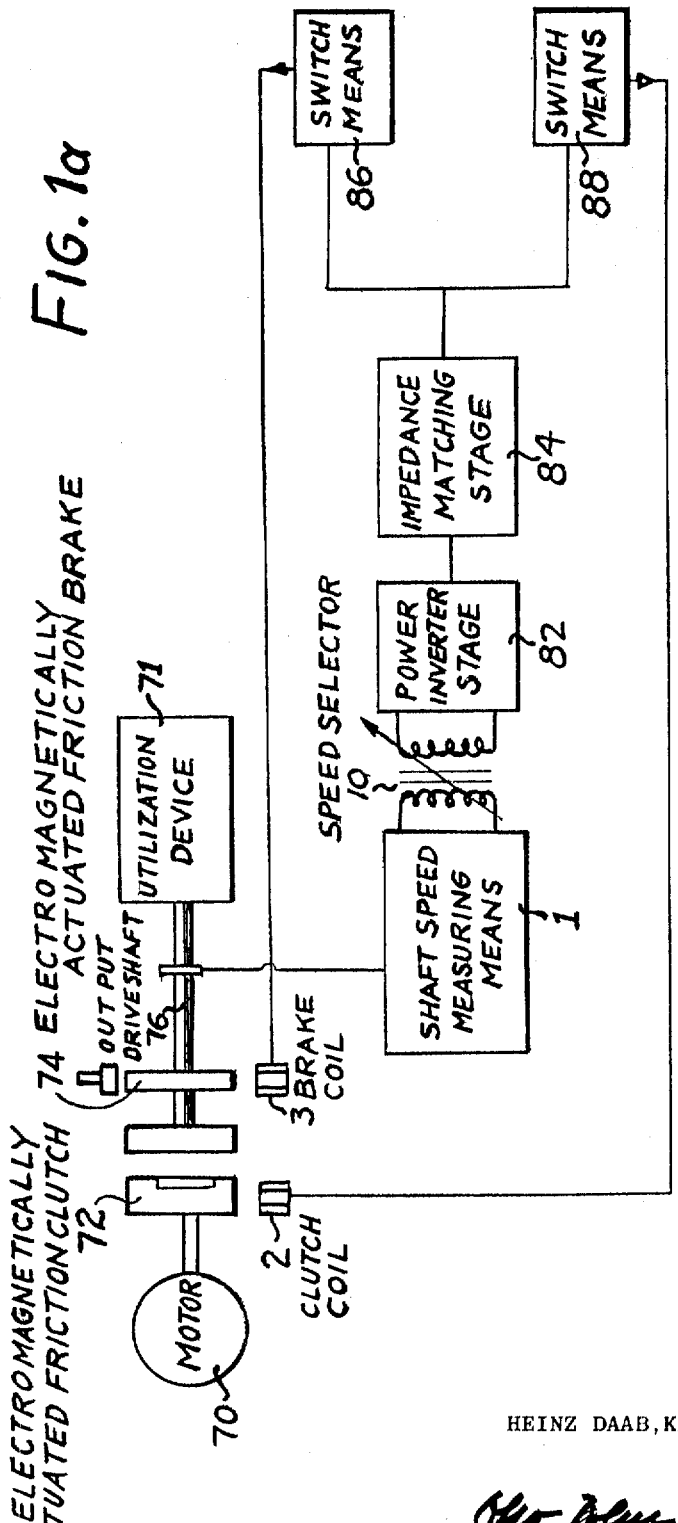

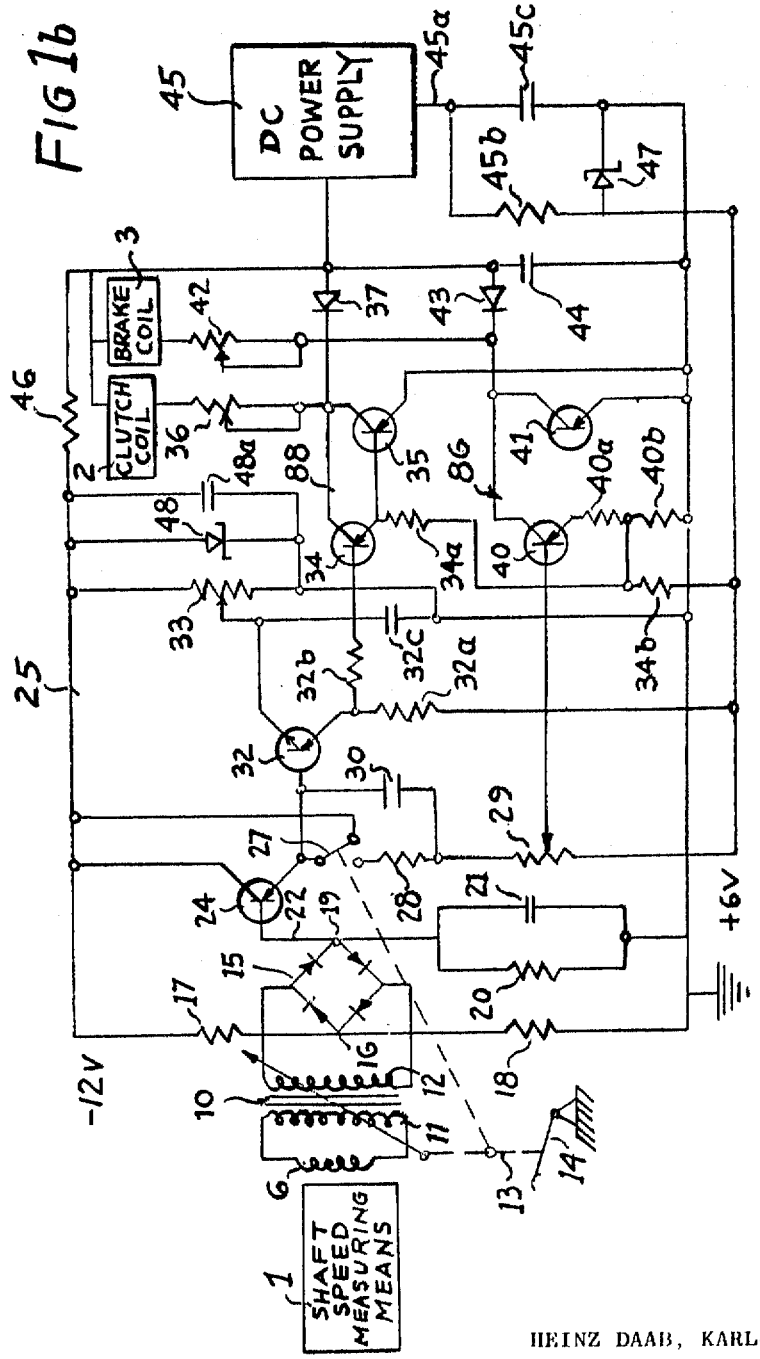

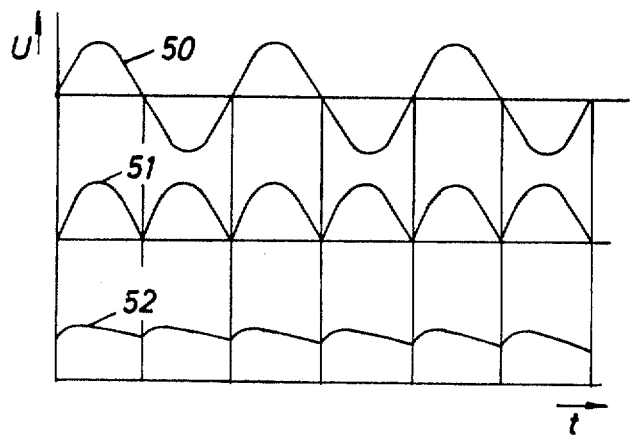
FIG.3a
FIG.3b
FIG.3c
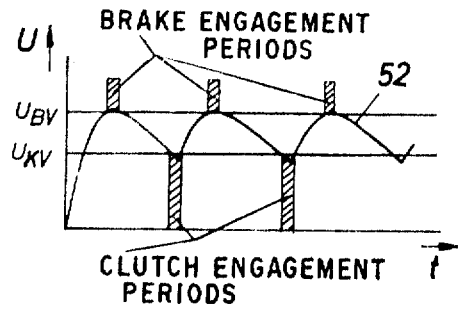
FIG.4a
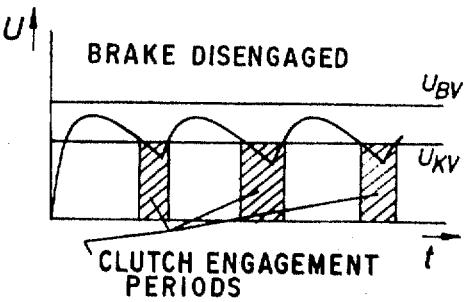
FIG.4b
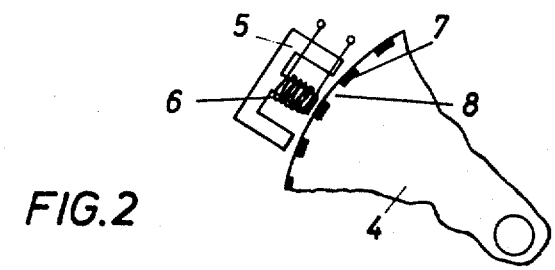
FIG.2
INVENTORS:
HEINZ DAAB,
KARL-HEINZ MEIER
BY
ATTORNEY

SHAFT SPEED CONTROL SYSTEM COMPRISING CLUTCH AND BRAKE

The present invention relates to an electrical drive for driving a machine shaft with controlled speed of rotation, having a clutch-brake assembly with an electromagnetically actuated friction clutch and friction brake.

In order to control the speed of shaft rotation, a centrifugal switch is usually provided which rotates together with the output shaft of a clutch-brake assembly for maintaining the exciting circuit of the clutch closed as long as the actual speed of rotation is less that the desired speed. The switch interrupts the clutch-exciting circuit when the actual speed of rotation is greater than the desired speed. Such a system is disclosed in U.S. Pat. No. 3,253,563. This type of regulation is relatively inaccurate because of the unavoidable response delay of the centrifugal switch. Furthermore, centrifugal switches are sensitive to mechanical vibrations and dirt. It is, to be sure, possible to set a desired speed of rotation by the use of a plurality of differently set centrifugal switches, but detection of a change in the desired speed of rotation is limited to a few predetermined speed stages. As a result, the regulating range is narrow.

The purpose of the present invention is to provide a clutch-brake drive which permits an accurate and rapidly responding adjustment to the speed of drive shaft rotation.

This purpose is achieved in accordance with the invention by means of an electrical drive which is characterized by a speed-measuring member mounted to an output drive. The member shaft supplies an alternating voltage whose amplitude is a function of the actual speed of rotation of the output drive shaft. A power inverter circuit transforms the output signal of the speed-measuring member into a DC voltage, which is essentially proportional to the speed of rotation. On the DC output signal voltage an alternating voltage is superimposed, fed to the system and thus it is possible to obtain from resultant small changes in speed of rotation, large changes in the duty cycle of clutch and brake currents. The sensitivity of the regulation is accordingly high and the regulating range is large.

As a further development of the invention, the power inverter circuit consists essentially of a full-wave rectifier in the form of a diode bridge followed by an RC circuit which effects a partial smoothing of the pulsating DC voltage supplied by the full-wave rectifier. Such an inverter circuit is particularly simple, economical and dependable. The output of the full-wave rectifier is preferably biased to a predetermined DC potential. In this way the system will respond dependably, even to very low input signals.

The control system preferably has two amplifier channels which are connected with a common input. One channel actuates the clutch while the other actuates the brake. An impedance-matching stage is preferably provided between the common input and the two amplifier channels for preventing undesired loading of the inverter circuit.

For establishing the desired speed of rotation (set point), a speed-setting member connected as a voltage attenuator, is preferably provided between the speed-measuring member and the input of the system. The voltage attenuator preferably takes the form of an adjustable transformer having a variable coupling factor and arranged between the speed-measuring member and the inverter circuit. Such a setting member has no contacts and thereby avoids all the disadvantages of mechanically moved contacts.

The two amplifier channels include switch transistors. The input circuit of the first switch transistor of each of the two amplifier channels is preferably biased to a predetermined voltage for the establishing of the reference voltages. This has the advantage of permitting the switch transistors to respond to even weak signals, exceeding a threshold value.

Speedup resistors are preferably connected with the windings of the electromagnetic clutch and brake in order to reduce the time constants of their energizing circuits.

For a speed-measuring member the present invention preferably employs an inductive voltage generator having a multipole radially magnetized permanent magnet disc mounted to the output shaft which induces a voltage in an adjacent core as the shaft rotates.

Furthermore features, advantages and possible uses of the invention which become evident from the following description of an illustrative embodiment, read in conjunction with the accompanying drawings, in which:

FIG. 1 shows the principle of an arrangement of the invention.

FIG. 1a is a block diagram of the invention.

FIG. 1b is an electrical schematic diagram of an arrangement in accordance with the invention;

FIG. 2 shows schematically an inductive speed-measuring member used in the arrangement of FIG. 1a.

FIG. 3a shows the voltage at the output of the speed-setting member;

FIG. 3b shows the rectified output of the speed-setting member;

FIG. 3c shows the voltage at the input of a control section;

FIG. 4a shows the input voltage of the control section as well as the clutch and brake voltages, when the machine is under no load;

FIG. 4b is a showing similar to FIG. 3a when the machine is under load;

FIG. 5a shows the output of the speed-measuring member during speed change;

FIG. 5b shows the voltage at the output of the desired speed-setting member during speed change;

FIG. 5c shows the voltage at the input of the control section during speed change;

FIG. 5d shows the voltage present on the clutch winding, and

FIG. 5e shows the voltage present on the brake winding during speed change.

Figure 5:
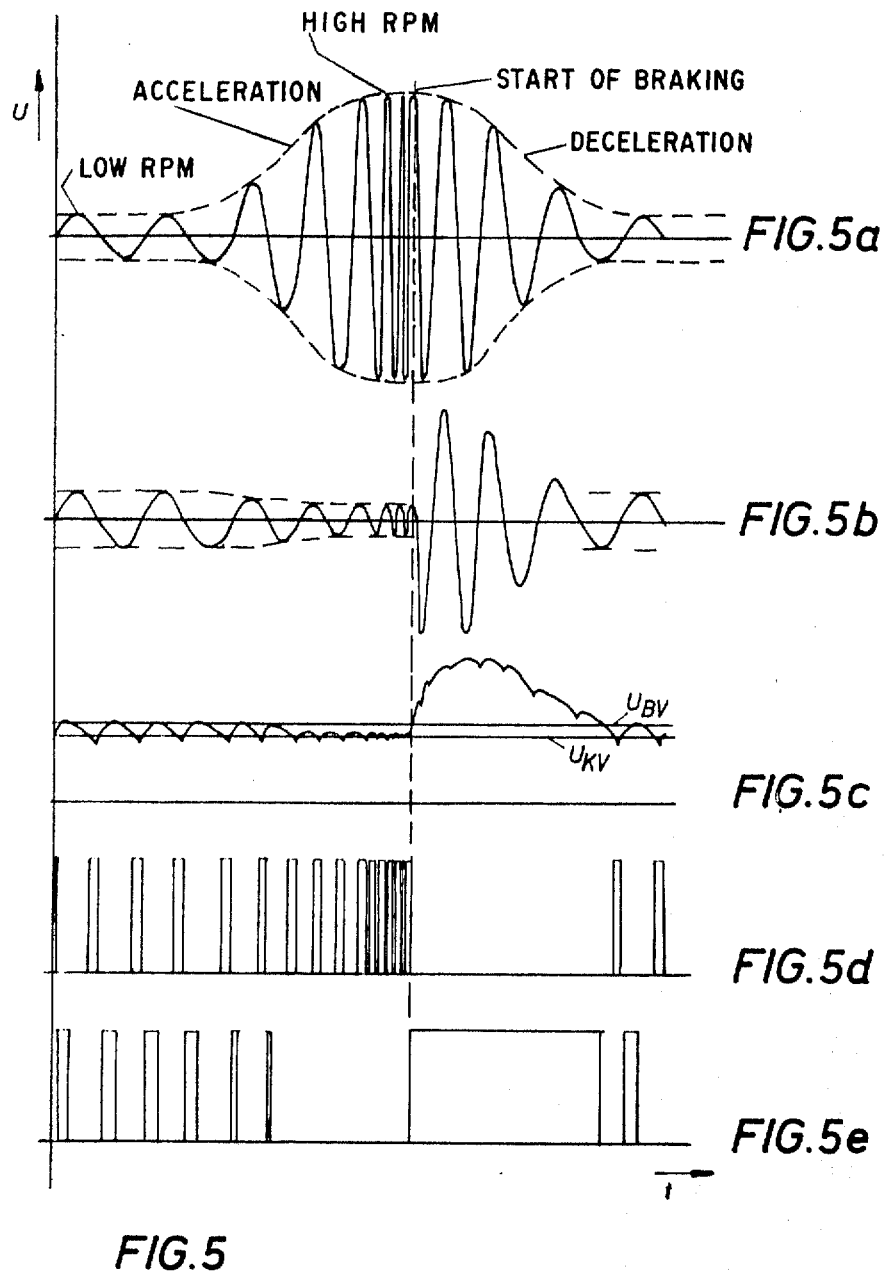
FIG. 5 shows diagrammatically the voltages which occur upon the starting and stopping of the drive.

By way of introduction, reference is made to FIG. 1a wherein a block diagram for the present electrical drive is shown to include a motor 70 for supplying rotational power to a utilization device 71, through an output drive shaft 76 selectively connected to the motor by an electromagnetic clutch 72 in line with an electromagnetic brake 74. A speed-measuring means 1 is mounted to the output drive shaft 76 and senses the rotational speed thereof. The output of the means is connected to a variable transformer 10 which establishes an AC voltage proportional to the desired shaft speed. A power inverter stage 82 converts the AC voltage to a pulsating DC form upon which the output circuits operate. An impedance matching stage 84 prevents excessive loading of the inverter and the speed-measuring means. The output circuits include two amplifier channels comprising electronic switch means 86 and 88 respectively detecting input signals above and below a reference voltage. Thus, when shaft 76 rotates at less than the preselected speed, switch means 88 is actuated and causes energization of clutch coil 2 resulting in continued engagement of the clutch between motor 70 and drive shaft 76 until the shaft exceeds the preselected speed, after which the switch means 86 becomes actuated and causes energization of brake coil 3 resulting in the operation of brake 74 until the speed of shaft decrease below the preselected speed whereby the cycle is repeated. Thus, the present invention is a control system adapted to alternately actuate clutch and brake for maintaining a constant drive shaft speed for the connected utilization device 71.

In detail, the circuit of FIG. 1b is controlled by a speed-measuring member 1 which supplies a voltage whose amplitude and frequency are dependent on, and is substantially proportional to the speed of rotation of the output shaft 76 and the drive motor 70 selectively rotates through an intermediate clutch-brake assembly. The assembly includes electromagnetically actuated friction clutch and friction brake components of which only the clutch winding 2 and the brake winding 3 are shown in FIG. 1b. A complete clutch-brake assembly is disclosed in copending application Ser. No. 838,931 filed July 3, 1969, now U.S. Pat. No. 3,592,316 issued July 13, 1971.

The speed measuring member may suitably be a miniature AC generator having a permanent magnet disc 4, shown in FIG. 2, which is seated on the output shaft 76. Opposite the disc, there is a ferromagnetic core 5 mounting coil 6. The circumferential surface of disc 4, voltages are included in the stationary coil 6 which satisfy the above-indicated condition, i.e., the amplitude and frequency are proportional to the speed of rotation of the output shaft 76. As can be noted from FIG. 2, the core 5 has an E-shaped cross section with legs of substantially the same width. The two outer legs are a distance equal to two poles away from the center leg. In this way assurance is had that a sufficiently large winding space is available for the coil 6 to fully confront each passing pole, even in the case of a large number of poles if the disc 4.

A desired-speed-setting member 10 is connected, as shown in FIG. 1, to the output of the speed-measuring member 1. In the example shown, this setting member consists of a variable transformer, which may by example be of the type disclosed in copending application Ser. No. 838,931 filed July 3, 1969, now U.S. Pat. No. 3,592,316 issued July 13, 1971, and a secondary, output winding 12. The degree of coupling of the two windings 11, 12 can be adjusted via a rod 13 by means of a pedal 14 which varies the airgap between the windings. The output of the secondary winding 12 is connected with a full-wave rectifier diode bridge 15, one DC output terminal 16 of which receives a bias voltage of −6 v., from the output terminal of a voltage divider having resistors 17 and 18. The other DC voltage output terminal 19 of the rectifier bridge 15 is connected, via a parallel connection of a bias resistor 20 and an AC bypass capacitor 21, to ground. Also, bridge terminal 16 is connected via a wire 22 with the base of a PNP transistor 24. The base of the transistor 24 forms the input of a control section designated generally as 25. The collector of transistor 24 is connected to the −12 v. bias line and serves as an impedance matching stage of high input resistance and low output resistance. It prevents excessive loading of the desired-speed-setting member 10 and of the RC circuit 20, 21.

A single-pole double-throw switch 27 which is mechanically actuated by rod 13 is shown in FIG. 1b in its OFF position to connect the emitter of the transistor 24 to the negative bias voltage of −12 volts, at which the collector of the transistor 24 is permanently held. In its OFF position, the switch 27 furthermore opens the connection between the emitter of the transistor 24 and the series circuit consisting of a bias resistor 28 and end terminals of a potentiometer 29, one side of which is connected to the positive bias voltage of +6 volts. An AC capacitor 30 is located in parallel with the series circuit consisting of the switch 27 and the resistor 28.

The NPN transistor 32, which serves as a reversing stage includes a base connected to the emitter of the transistor 24. The emitter of the transistor 32 is connected to the wiper of the potentiometer 33 which is connected between −12 volts and ground. The collector of the transistor 32 is connected to the +6 volt bias voltage through a load resistor 32a. AC collector grounding occurs through capacitor 32c. The input of a PNP driver transistor 34 which controls an output PNP transistor 35 is connected with the collector-side output of the transistor 32 through coupling of the resistor 32b. The emitter of transistor 34 is connected to +6 volts bias through bias resistors 34a and 34b. The collector circuit of the output of the transistor 35, is directly connected to the collector of transistor 34 and in parallel with a variable dropping resistor 36 which in turn is connected in series with the clutch winding 2. Parallel to the series circuit consisting of clutch winding 2 and dropping resistor 36 is a diode 37 which prevents overload of transistor 35 as hereinafter explained.

The wiper of the potentiometer 29 is connected with the base input of a second PNP driver transistor 40 which controls an output PNP transistor 41. The emitter of transistor 40 is connected to two series bias resistors 40a and 40b which is grounded. In the collector circuit of the output transistor 41, there are provided a dropping resistor 42, the serially connecting brake winding 3, and an overload-protecting diode 43 is connected in parallel to them, as explained hereinafter. An AC bypass capacitor 44 is connected between the diodes 37, 43 and ground. The supply 45 supplies a negative operating voltage of −24 volts, from which the bias voltage of −12 volts is derived through a voltage-dropping resistor 46.

The power supply 45 includes an output terminal 45a which furnishes +6 volt bias. A parallel branch comprising current-limiting resistor 45b and AC bypass capacitor 45c is connected to this terminal. A zener diode 47 is connected between the free ends of the RC combination to provide voltage regulation of the +6 volt bias. Thus, should the bias exceed +6 volts by a preselected tolerance, avalanche occurs until +6 volts once again becomes the steady state bias. In order to regulate the −12 volt bias, zener diode 48 is connected between the bias line and ground. A shunt capacitor 48a prevents spurious breakdown of the diode.

The circuit arrangement operates as follows.

Let us first of all assume that the pedal 14 is not depressed. This has the result that the coupling between the primary winding 11 and the secondary winding 12 of transformer 10 is at the highest value (approximately 1) and the switch 27 is in the OFF position. In this position the switch 27 applies the operating voltage of −12 volts to the base of the transistor 32. The base of the transistor 32 is accordingly at a higher negative potential than the emitter of this transistor, which is maintained at a preset typical voltage of −6 volts, via the potentiometer 33 which acts as voltage divider. The transistor 32 is therefore blocked. This means that the base potential of the driver transistor 34 is positive with respect to the emitter potential and the transistor 34 is also blocked. Since the driver transistor 34 is without current, the output transistor 34 is also blocked. The clutch winding 2 is without current. The switch 27 in its OFF position furthermore disconnects the base of the driver transistor 40 from the emitter of the transistor 24, so that the base of the driver transistor 40 becomes more positive than the emitter of this transistor and the driver transistor 40 blocks. This has the result that the output transistor 41 is also blocked. The brake winding 3 is without current. Therefore, neither clutch nor brake component of the clutch-brake assembly is actuated. The motor 70 idles and the output shaft 76 is stationary. The speed-measuring member 1 does not generate any voltage.

Let us now assume that the pedal 14 is depressed. In this way, the switch 27 is brought into the ON position. The base of the transistor 32 is disconnected from −12 volts and the connection between the emitter of the transistor 24 and the resistor 28 is established. Since the speed of rotation is at first still 0, the speed-measuring member 1 does not generate any voltage. At the input 22 of the control section 25, there is present the bias voltage of the rectifier bridge 15 established by the resistors 17, 18, less the voltage drop of the bridge. This permits the production at the base of the transistor 32 of a voltage (approximately −5.5 v.) which is sufficient to turn on transistor 32. The transistor 32 supplies current to the base of the driver transistor 34 which turns on the output transistor 35. The clutch winding 2 receives current via the dropping resistor 36. The clutch responds; the output shaft is connected to the continuously rotating motor shaft and starts to turn. Since the clutch winding 2 is continuously under voltage during the starting process, the speed of the output shaft and thus the output voltage of the speed measuring member 1 rapidly increase.

FIG. 3a shows the variation, with time, of the voltage 50 induced in the secondary winding 12; FIG. 3b shows the voltage 51 which would be obtained at the output side 19 of the rectifier bridge 15 if there was no loading. Due to the fact that the RC members 20, 21 having, for instance, a time constant $T=RC$ of about 20 msec., is connected to the output 19 of the rectifier bridge 15, the pulsating DC voltage 51 is converted into the voltage signal 52 as shown in FIG. 3c. The voltage signal 52 is a DC voltage with superimposed alternating voltage corresponding to the change in charge of the capacitor 21.

The increase in speed continues until the amplitude of the voltage 52 at the base of the transistor 24 for the first time reaches such a value that the driver transistor 40 and the output transistor 41 open and the brake winding 3 conducts current.

As can be noted from FIG. 4a, the circuit is so designed that when the machine is without load, the voltage 52 at the input of the control section 25 reaches, for a brief time in each half cycle of the voltage 50, a first value at which the transistors 40, 41 and thus the brake winding 3 conduct current. During each half cycle, a second value is reached at which the transistors 34, 35 and the clutch winding 2 become conductive. The voltage value at which the brake is connected is designated by $U_{BV}$ in FIG. 4a, while the voltage value for the response of the clutch is designated $U_{KV}$. The voltage $U_{BV}$ is therefore that voltage at the input 22 at which the driver transistor 40 passes from the blocked condition into the conductive condition, while the voltage $U_{KV}$ is the voltage which is required at the input of the control section 25 in order to bring the driver transistor 34 out of the blocked condition into the conductive condition. The voltage $U_{BV}$ is set by means of the potentiometer 29, and the voltage $U_{KV}$ by means of the potentiometer 33. The control section 25 operates essentially in the manner of a continuous monitor which alternately in accordance with the signal current cycles excites the clutch winding 2 and the brake winding 3 so that the desired speed set on the setting member 10 is maintained.

If the machine is placed under load, the voltage of the speed-measuring member drops temporarily. The base potential of the transistor 24 drops; the base potential of the transistor 32 increases. Accordingly, the base potential of the driver transistor 34 drops. The clutch winding 2 becomes conductive for a long period of time (FIG. 4b). At the same time the base potential of the driver transistor 40 becomes less negative with the result that the brake remains disengaged. The speed is again brought back to the preset value.

FIGS. 4a and 4b are to be considered purely diagrammatic drawings intended to show the principle of the manner of operation of the control section 25. By the interplay of clutch and brake, it is seen to it that the speed of rotation determined on the desired-speed-setting member 10 will be maintained independent of the load.

Let us now assume that the pedal 14 is pressed down further. In this way, the coupling of the windings 11, 12 of the desired-speed-setting variable transformer 10 is reduced. Although the speed of rotation and thus the voltage supplied by the speed-measuring transformer momentarily maintain their prior value, this has the result that the voltage on the secondary winding 12 drops. Accordingly, the potential at the base of the transistor 32 increases and the transistor 32 conducts more heavily. Accordingly, the integral of the current flowing through the clutch winding 2 increases. The increase of the integral of the clutch current continues until the voltage given off by the speed-measuring member 1 has reached such a value that the potential at the base of the transistor 32 has been brought back approximately to the original value. When the pedal 14 is pressed down still further, this cycle is repeated until the desired maximum speed of rotation of the output shaft of the clutch motor is obtained.

If the pedal 14 is suddenly released when operating with maximum speed of rotation, the degree of coupling of the windings 11, 12 is brought to the maximum value (equal to practically 1). Accordingly, the full voltage of the speed-measuring member 1 is transmitted via the desired-speed-setting member 10. The negative voltage at the emitter of the transistor 24 increases rapidly. The driver transistor 34 is controlled so as to close, while the driver transistor 40 is controlled so as to open. The brake winding 3 receives continuous current and the braking takes place so rapidly that the speed of rotation has already dropped greatly before the switch 27 reaches the OFF position. As soon as the switch 27 has again arrived in the OFF position, the bias-connected plate, of the capacitor 30 is suddenly connected to −12 volts as seen in FIG. 1a. Since this capacitor plate was previously at the base potential of the transistor 32 approximately −5.5 volts, the capacitor 32 must now charge itself by about 6 volts. In this way, the driver transistor 40 is again turned on fully and the output shaft brakes further. With an increase in the charging of the capacitor 30, the voltage at the base of the transistor 40 drops. When the capacitor 30 is charged and the junction point of the resistors 28, 29 has again reached positive potential (from 0 to +6 v.), the transistors 40, 41 are blocked and the brake winding 3 is deenergized. The length of time during which the brake remains connected after the switch 27 has reached the OFF position is determined by the time constant of the capacitor 30 and the potentiometer 29. It is so selected that the output shaft definitely stops upon the final blocking of the transistors 40, 41.

In FIG. 5, there are diagrammatically shown the voltages which occur upon the starting and stopping of the drive. FIG. 5a shows the voltage measured directly at the output of the speed-measuring member 1; FIG. 5b the voltage at the secondary winding 12 of the desired-speed-setting member 10; FIG. 5c the voltage at the input 22 of the control section 25; FIG. 5d the voltage at the clutch winding 2; and FIG. 5e the voltage at the brake winding 3.

The diodes 37 and 43 prevent the transistors 34, 35 and 40, 41 from being acted on by injurious overvoltages when, after the blocking of the respective output transistors 35 and 41, the energy stored in the clutch winding 2 and the brake winding 3, respectively, is dissipated.

The dropping resistors 36 and 42 are provided in order to maintain the time constant of the clutch and brake exciting circuits small and thus accelerate the clutch and brake response.

We claim:

1. In an electric drive having an output shaft, a driving motor and an intermediate electromagnetically actuated clutch and a brake in assembly connecting said motor to a utilization device, a control system for regulating the speed of said output shaft, comprising:

shaft speed measuring means including means to generate an AC voltage signal of an amplitude which is a function of the actual speed of said output shaft;

a power inverter means connected to the output of said means to generate and including means to convert the output signal of said means to generate into an output signal having a DC signal component proportional to the amplitude of the AC voltage and a pulsed DC voltage component superimposed thereon;

an impedance-matching circuit connected to the output of said power inverter means;

means to actuate said clutch through said impedance-matching circuit, when the output signal of said power inverter means falls below a first reference voltage, and to actuate said brake when the output signal of said power inverter means exceeds a second, higher, reference voltage.

2. A control system for use in a motor drive as claimed in claim 1, said speed-measuring means comprising a desired shaft-speed-presetting means to a first lower and a second higher reference value and means to alternately excite the winding of said clutch and the winding of said brake to maintain the speed preset on said presetting means.

3. The control system of claim 1 wherein the power inverter means comprises a full-wave rectifier having an input and an output, a parallel combination of a resistor and a capacitor connected to the rectifier output for smoothing pulsating DC voltage appearing at the output, the pulsating DC voltage being produced by biased full-wave rectification of the generated AC output from the measuring means.

4. The control system of claim 3 together with impedance-matching means connected between the power inverter means and both switch means to prevent undue loading of the power inverter means.

5. The control system of claim 3 together with adjusting means disposed in circuit between the speed-measuring means and the power inverter means for selecting a desired output shaft speed.

6. The system set forth in claim 5 wherein the adjusting means comprises a transformer having a primary coupled to the shaft-speed-measuring means and a secondary connected to the input of the rectifier, the airgap between the windings being adjustable to effect a variable coupling factor therebetween.

7. The system set forth in claim 6 wherein the first and second switch means are characterized by solid-state semiconductor devices having indefinite useful lives.

8. The system defined in claim 7 together with means for varying the bias on the semiconductor devices resulting in the establishment of the respective preselected reference voltages.

9. The system of claim 8 wherein the clutch and the brake include energizing input circuits connected in circuit with the first and second switch means which supply power thereto, and means connected to the windings of said clutch and brake for reducing the time constant of the input circuits.

10. The system set forth in claim 3 wherein the speed-measuring means comprises an inductive voltage regulator having a magnetic disc of multiple peripheral poles secured to the output shaft, and a stationary core positioned adjacent the disc, the core being characterized by an E-shaped cross section, the central leg of the core mounting a coil across which an AC voltage is induced as the disc rotates with the shaft, the two outer legs of the core being displaced from the central leg by an amount equal to two adjacent poles of the disc.

11. An electric drive for operating a utilization device comprising, a motor having an output shaft;

an output drive shaft, an electromagnetic clutch-brake assembly interposingly connecting the drive shaft and the motor shaft;

the utilization device being connected to the output shaft and deriving power therefrom;

an electronic control system for regulating output shaft speed including shaft speed measuring means for generating AC voltage whose amplitude is a function of the actual speed of the output shaft;

power inverter means responding to the measuring means for converting the generated AC output of the measuring means into an output signal having a DC voltage signal component substantially proportional to the amplitude of the AC voltage and a pulsed DC voltage component superimposed thereon;

first switch means connected to the clutch for causing energization thereof in response to an output voltage dropping below a first preselected reference value; and second switch means connected to the brake for causing energization thereof in response to a second preselected reference value being higher than the first.

12. The system of claim 11 wherein the power inverter means comprises a full-wave rectifier having an input and an output, a parallel combination of a resistor and a capacitor connected to the rectifier output for smoothing pulsating DC voltage appearing at the output, the pulsating DC voltage being produced by biased full-wave rectification of the generated AC output from the measuring means.

13. The system of claim 12 together with impedance-matching means connected between the power inverter means and both switch means to prevent undue loading of the power inverter means.

14. The system of claim 12 together with adjusting means disposed in circuit between the speed-measuring means and the power inverter means for selecting a desired output shaft speed.

15. The system set forth in claim 14 wherein the adjusting means comprises a transformer having a primary coupled to the shaft-speed-measuring means and a secondary connected to the input of the rectifier, the airgap between the windings being adjustable to effect a variable coupling factor therebetween.

16. The system set forth in claim 15 wherein the first and second switch means are characterized by solid-state semiconductor devices having indefinite useful lives.

17. The system defined in claim 16 together with means for varying the bias on the semiconductor devices resulting in the establishment of the respective preselected reference voltages.

18. The system of claim 17 wherein the clutch and the brake include energizing input circuits connected in circuit with the first and second switch means which supply power thereto, and means connected to the windings of said clutch and brake for reducing the time constant of the input circuits.

19. The system set forth in claim 12 wherein the speed-measuring means comprises an inductive voltage regulator having a magnetic disc of multiple peripheral poles secured to the output shaft, and a stationary core positioned adjacent the disc, the core being characterized by an E-shaped cross section, the central leg of the core mounting a coil across which an AC voltage is induced as the disc rotates with the shaft, the two outer legs of the core being displaced from the central leg by an amount equal to two adjacent poles of the disc.